United States Patent
Kathpalia et al.

(10) Patent No.: US 10,853,100 B1
(45) Date of Patent: Dec. 1, 2020

(54) SYSTEMS AND METHODS FOR CREATING LEARNING-BASED PERSONALIZED USER INTERFACES

(71) Applicant: CADENCE DESIGNS SYSTEMS, INC., San Jose, CA (US)

(72) Inventors: Sonam Kathpalia, Noida (IN); Mehakpreet Kaur, Amritsar (IN); Sameer Chakravarthy Chillarige, Greater Noida (IN); Krishna Vijaya Chakravadhanula, Vestal, NY (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/214,720

(22) Filed: Dec. 10, 2018

(51) Int. Cl.
  *G06F 8/34* (2018.01)
  *G06F 9/451* (2018.01)
  *G06F 16/2457* (2019.01)
  *G06F 16/28* (2019.01)

(52) U.S. Cl.
  CPC .......... *G06F 9/451* (2018.02); *G06F 8/34* (2013.01); *G06F 16/24578* (2019.01); *G06F 16/287* (2019.01)

(58) Field of Classification Search
  CPC .... G06F 16/287; G06F 16/24578; G06F 8/34; G06F 8/30; G06F 3/04842; G06F 9/451
  USPC .................. 715/745, 760, 762, 763
  See application file for complete search history.

(56) References Cited

U.S. PATENT DOCUMENTS

| | | | | |
|---|---|---|---|---|
| 2002/0186241 A1* | 12/2002 | Kohda | ............. | G09G 5/00 715/744 |
| 2009/0049389 A1* | 2/2009 | Kuzmanovic | ........... | G06F 9/451 715/745 |
| 2011/0131513 A1* | 6/2011 | Yamamoto | .............. | G06F 9/451 715/763 |
| 2014/0089816 A1* | 3/2014 | DiPersia | ............... | G06F 3/0484 715/753 |

\* cited by examiner

*Primary Examiner* — Rinna Yi
(74) *Attorney, Agent, or Firm* — Tarolli, Sundheim, Covell & Tummino LLP

(57) ABSTRACT

Systems and methods for creating learning-based personalized user interfaces for software applications are described. Exemplary embodiments provide for collecting usage data and applying machine learning techniques to identify and prioritize certain commands and options in the personalized user interface. The usage data can include Usage patterns, usage sequences, and the usage of certain commands and options in connection with, or following, certain other commands and options may also be identified, and the personalization-based prioritization can include, for example, the contents, position, and quantities of the commands and options within the interface.

20 Claims, 7 Drawing Sheets

Method (600)

User Interface 500

SYSTEMS AND METHODS FOR CREATING LEARNING-BASED PERSONALIZED USER INTERFACES

FIELD OF THE INVENTION

This disclosure relates to user interfaces, and more specifically, to systems and methods for creating learning-based personalized graphical user interfaces.

BACKGROUND

Software programs are ubiquitous in modern society, and a user can utilize multiple applications professionally and personally every day. Software programs can have widely varying levels of complexity, and programs can frequently offer users a choice of hundreds of commands, display icons, and options. As a result, users are presented with cumbersome and non-intuitive user interfaces in many currently available applications, which can be overwhelming.

In addition, software users can frequently be required to utilize new applications, or updated versions of known applications. New applications can present a user with an unknown user interface, and application updates may modify a known interface in an unfamiliar way, and changes to user interfaces can be very noticeable to users.

Each time a user encounters a cumbersome or non-intuitive user interface, learns to use a new application, or adapts to an updated or otherwise changed application, the user can progress through a learning process prior to reaching a level of comfort and proficiency. This process can require significant time and effort, which can result in wasted time, lost productivity, and a degraded user experience. Further, a user may only use a subset of the total commands offered by the program and may only use an even smaller subset frequently. Browsing or sorting through a large number of unnecessary commands can distract and frustrate the user, lowering productivity and creating an unpleasant user experience.

Conventional user interfaces may display commands, icons, and options in a predetermined manner, e.g., in alphabetical order. This can be a poor match for how the user utilizes the program, causing rarely used choices to be at or near the top of the list, while frequently used choices are placed less prominently and are much more difficult to view and access. As another example, choices can be displayed based on the software developer's expectation of user proficiency, e.g., a "beginner" display, a "standard" display, and an "expert" display. However, predetermined configurations may not be helpful to users, who may find them unintuitive, difficult to navigate, or a mismatch for their abilities and knowledge. Conventional user interfaces may offer the user the option to manually change the display and ordering of certain commands or display icons, but this requires that the user expend time and effort to determine and implement their preferences, update the customization options as preferences and work requirements change, and may require the user to re-implement their preferences following a software update or other change.

Accordingly, there is a need for user interfaces that are intuitive to users and that can be learned and implemented with reduced expenditures of time and effort.

DETAILED DESCRIPTION

Figure 1:
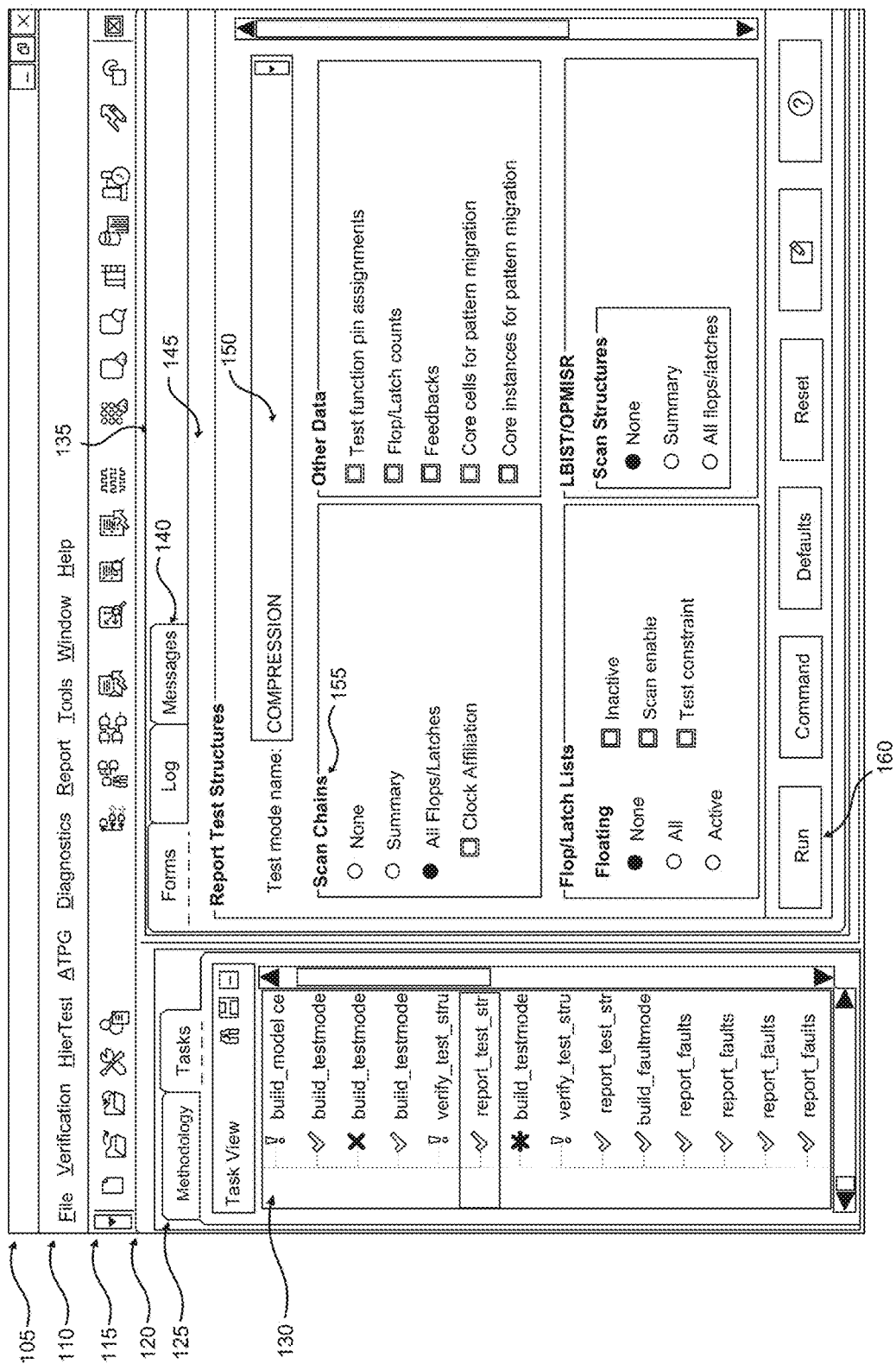
FIG. 1 illustrates an example embodiment of a personalized user interface.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide systems and methods for creating learning-based personalized user interfaces for software applications. In an embodiment, a personalized user interface can be created by applying machine learning techniques to information collected through the use of the application. Based on this information and the application of machine learning techniques, more frequently used commands and options can be identified and prioritized in the personalized user interface, while less frequently used commands and options may be de-prioritized or hidden. Usage patterns, usage sequences, and the usage of certain commands and options in connection with, or following, certain other commands and options may also be identified, and machine learning can also be applied to this information. The personalization-based prioritization can include, for example, the contents, position, and quantities of the commands and options within the interface.

According to an embodiment, a system for generating a personalized user interface, comprises: a server containing a personalization database, the personalization database storing usage information; a client device, having a processor, a memory, a display, and a user input; a software application having a user interface, the software application configured to execute on the client device; and a personalization tool, wherein the personalization tool is configured to: collect user usage information relating to the use of the software application by a user; identify one or more elements of the user interface; assign each of the one or more elements to a category; rank each of the one or more elements of the user interface within its assigned category based on one or more parameters, and adjust the display of the one or more elements of the user interface based on the ranking.

According to an embodiment, a method of generating a personalized user interface, the method comprises: identifying a category of display elements, the category including a plurality of display elements; enumerating each of the plurality of display elements; identify at one or more parameters for each of the plurality of display elements; assigning a weight to each of the one or more parameters for each of the plurality of display elements; ranking each of the plurality of display elements based on the weights of the one or more parameters; and displaying the plurality of elements in order of rank.

The interfaces described herein are not limited to a specific application or implementation. For example, the personalized interfaces can be in a variety of applications, including without limitation, office productivity applications (e.g., word processing, spreadsheet, database, and presentation programs), gaming and entertainment programs (e.g., video games, streaming video, online games, single or multiplayers game), niche specialized programs (e.g., technical programs, analytical programs, machine operation and control programs), administrative (e.g., accounting and financial management programs), and others. Further, the personalized interfaces described herein can be implemented on smartphones, laptop computers, desktop computers, tablet computers, personal digital assistants, thin clients, fat clients, Internet browsers, or customized software applications, or any type of device that supports the communication and display of data and user input.

It is understood that the terms commands and options as used herein refer to, without limitation, commands, options, choices, menus, icons, headings, text boxes, windows, widgets, input or output fields, labels, variables, or other means for user to view, select, input, or output text or images from a user interface. It is further understood that a command or option illustrated as, e.g., an icon, is not limited thereto, and instead the command or option may be, e.g., a drop-down menu, radio button, check box, speech recognition, or any form of user input or selection. It is further understood that the term command or option can refer to a listing of files displayed on an interface.

User interface elements are illustrated in the personalized user interfaces depicted in FIGS. 1-4 and these illustrations are exemplary. The present disclosure is applicable to any element of a user interface that displays information to a user or receives information from a user. Further, while certain user interface elements are illustrated singularly and certain user interface elements are illustrated plurally, it is understood that the present disclosure is not limited to a specific quantity of user interface elements. It is further understood that the interface elements described herein are not limited to the content illustrated, and the present disclosure includes the display of any information, e.g., any textual information and any graphical information.

FIG. 1 illustrates a personalized user interface according to an example embodiment of the present disclosure. As shown in FIG. 1, a personalized user interface 100 comprises a window 105 that can display visual information, such as text, icons, or images, to the user as a graphical user interface. For example, the window 105 can be an application window, a container window, a browser window, or a message window. The window 105 can include a menu bar 110, an icon bar 115, a side panel 120, one or more side panel tabs 125, a side panel content area 130, a main panel 135, one or more main panel tabs 140, a main panel content area 145, a drop-down menu 150, one or more main panel content blocks 155, and one or more buttons 160.

The menu bar 110 and icon bar 115 can be positioned horizontally near the top of the window 105, as shown in FIG. 1, or can be positioned on the left side, right side, bottom, or elsewhere within window 105. The menu bar 110 can include one or more menu headers, shown as "File," "Verification," "HierTest," "ATPG," "Diagnostics," "Report," "Tools," "Window," and "Help" in FIG. 1, and when clicked, each of these headers may display a drop-down menu. The headers in menu bar 110 can be ordered according to frequency of use. For example, the more frequently used headers can appear towards the left side of menu bar 110, and the less frequently used headers may appear towards the right side of menu bar 110. As another example, the most frequently used header can appear on the left end of menu bar 110 and the least frequently used header can appear on the right end of menu bar 110. In an embodiment, the headers can be arranged in menu bar 110 in descending order of frequency of use from left to right. In another embodiment, the headers can be arranged in menu bar 110 in ascending order of frequency of use from left to right.

In an embodiment, the headers of menu bar 110 may be arranged in order of frequency of use with clustering, in which less frequently used commands or options can be arranged with more frequently used commands or options due to frequent associated use. For example, with reference to FIG. 1, "File" header may be the most frequently used header, "Verification" may be the second most frequently used, "ATPG" may be the third most frequently used" and "HierTest" may be the fourth most frequently used. However, if the "HierTest" header is often, or only, accessed after commands or options from the "Verification" header are selected, then "HierTest" header can appear to the direct left of the "Verification" header in menu bar 110 despite being used less frequently that the "ATPG" header.

Icon bar 115 can be positioned horizontally below menu bar 110 as shown in FIG. 1, or can be positioned elsewhere within window 105. In an embodiment, the icon bar 115 can include one or more icons, i.e., a graphic symbol representing a command, option, or file, that can be accessed or executed when clicked by a user. The icon bar 115 can display icons for creating a new file, opening an existing file, saving data to a file, saving a file under a new name, cutting, copying, or pasting data, and other icons, including more application-specific and device-specific icons. As with the headers of menu bar 110, in an embodiment the icons displayed in icon bar 115 can be ordered in terms of frequency of use or based on patterns of usage. In an embodiment, the icons can be ordered based on frequency of use with clustering.

The side panel 120 can be oriented vertically within the window 105 and to the left of main panel 135, as illustrated in FIG. 1, and may include side panel tabs 125 and side panel content area 130. The side panel content area 130 can display information, such as a listing of commands or options for the user, and the side panel tabs 125 can allow the user to switch the side panel content area 130 between displays. The contents of the side panel 120, including the side panel tabs 125 and the side content area, can be personalized for the user based on, for example, frequency, patterns of usage, and frequency of usage with clustering.

The main panel 135 can appear to the right of the side panel 120, and the main panel 135 can include one or more main panel tabs 140, a main panel content area 145, a drop-down menu 150, one or more main panel content blocks 155, and one or more buttons 160. In an embodiment, the main panel tabs 140 and the main panel content area 145 can function similarly to the side panel tabs 125 and the side panel content area 130. The drop-down menu 150 can also function to switch the commands or options displayed in the remainder of the main panel content area 145. In an embodiment, each of the main panel content blocks 155 can include commands and options for display, and these commands and options can be related to the text displayed at the top of their respective content boxes. The buttons 160, which can indicate different commands and options for the user, can be displayed in a horizontal arrangement near the bottom of the main panel content area 145. The position and contents of each of these elements can be personalized for the user based on, for example, frequency, patterns of usage, and frequency of usage with clustering. In an embodiment, the position of a main panel content block 155 relative to other main panel content blocks 155 can be personalized, along with the commands and options displayed within each block.

In an embodiment, the personalization of the user interface 100 can include the dynamic generation of forms for the presentation of the commands and options, with the placement of commands or options based on frequency, patterns of usage, or frequency of usage based on clustering. For example, the main panel content blocks 155 can be arranged such that the blocks containing the most commonly used command and options can appear at a prominent position within the main panel 135 (e.g., the top or center). As another example, the commands and options displayed can be personalized for display within the main panel content blocks 155.

Figure 2:
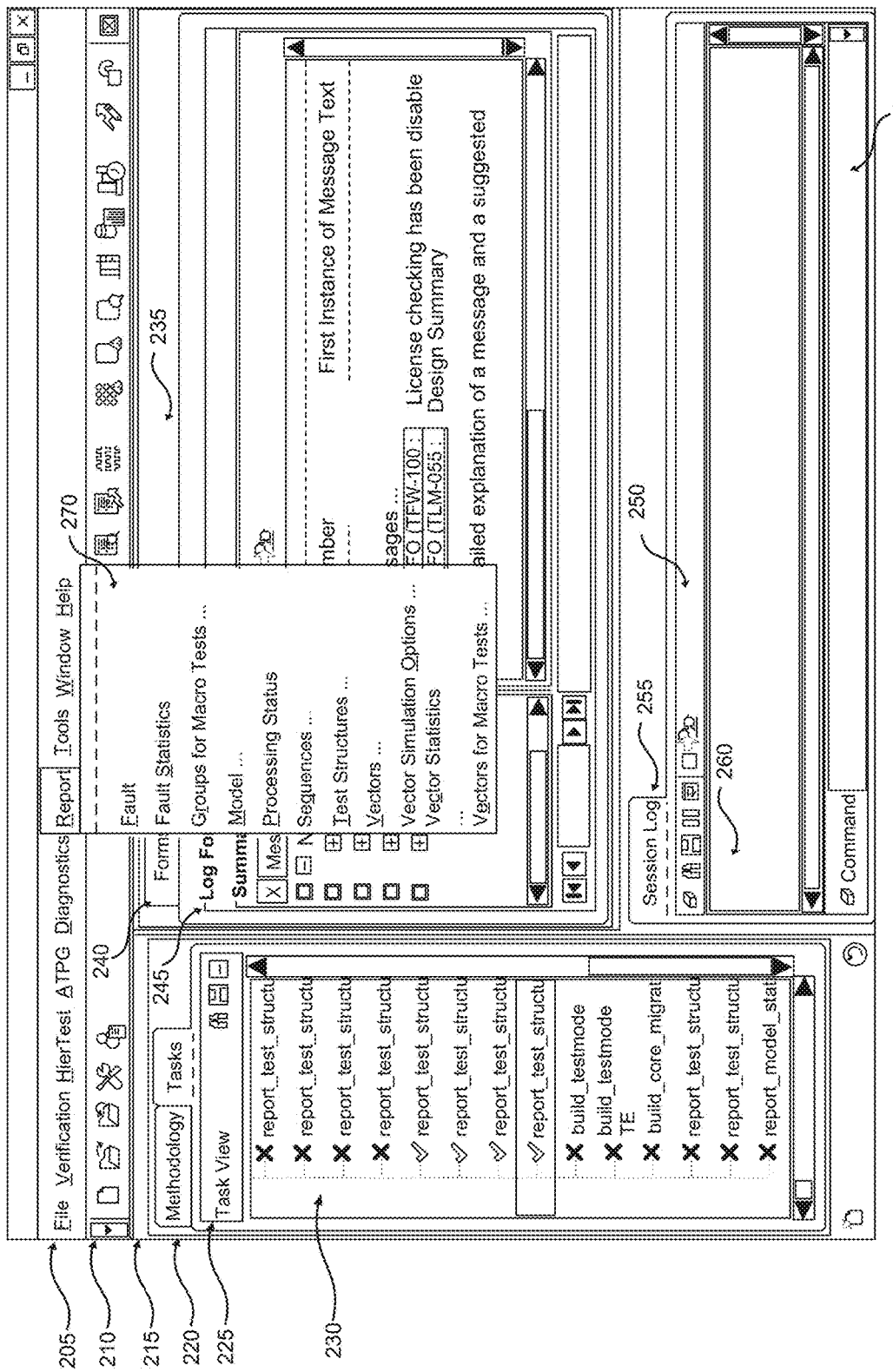
FIG. 2 illustrates an example embodiment of a personalized user interface.

FIG. 2 illustrates a personalized user interface according to an example embodiment of the present disclosure. As shown in FIG. 2, a personalized user interface 200 comprises a window 205 that can display visual information. Like window 105 of FIG. 1, window 205 and which can be an application window, a container window, a browser window, or a message window. The window 205 can include a menu bar 210, an icon bar 215, a side panel 220, one or more side panel tabs 225, a side panel content area 230, a main panel 235, one or more main panel tabs 240, a main panel content block 245, a bottom panel 250, one or more bottom panel tabs 255, one or more bottom panel content blocks 260, and a bottom panel input box 265. In an embodiment, the menu bar 210, icon bar 215, side panel 220, one or more side panel tabs 225, side panel content area 230, main panel 235, one or more main panel tabs 240, and main panel content block 245 can function and be personalized in the same manner as the corresponding elements in personalized user interface 200.

The bottom panel 250 can be oriented horizontally below the main panel 235, as shown in FIG. 2, or can be oriented in a different manner relative to the main panel 235. The bottom panel 250 can include one or more bottom panel tabs 255 and one or more bottom panel content blocks 260, which can function and be personalized in the same manner as the tabs and content blocks illustrated in FIG. 1. The bottom panel 250 can further include a bottom panel input box 265. The bottom panel input box 265 can be, for example, a text input box or a drop-down menu. In an embodiment, the position and contents of bottom panel input box 265 can be personalized based on, for example, frequency, patterns of usage, and frequency of usage with clustering.

As shown in FIG. 2, the menu bar 205 may have one or more headers that, upon selection, reveal a series of menu choices 270. In an embodiment, the order and grouping of the menu choices 270 can be personalized. For example, the most frequently used of the menu choices 270 can be placed at the top of the list, and less frequently used choices can be displayed near the bottom of the list. As another example, the menu choices 270 can be grouped based on patterns of usage or clustering.

Figure 3:
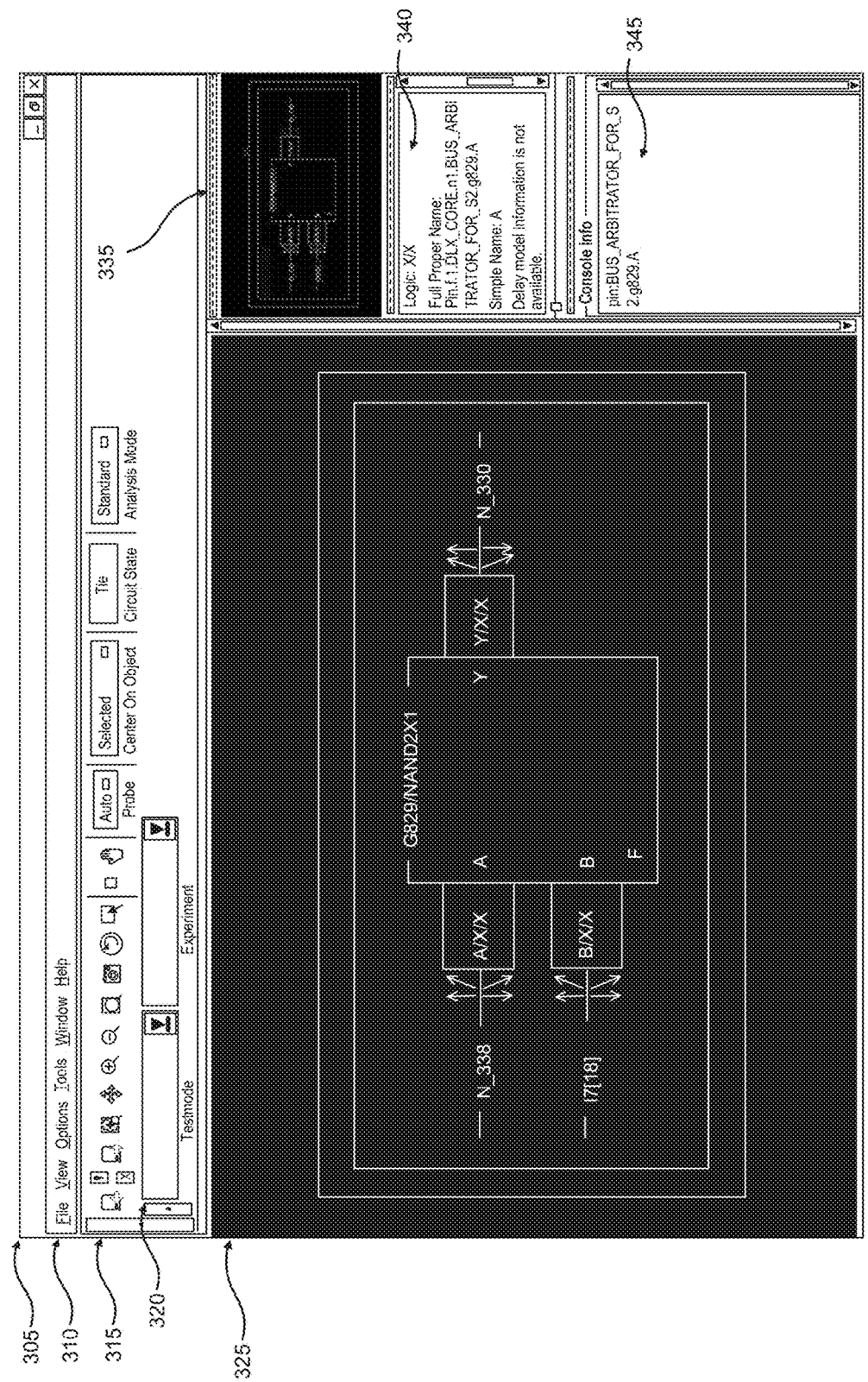
FIG. 3 illustrates an example embodiment of a personalized user interface.

FIG. 3 illustrates another personalized user interface according to an example embodiment of the present disclosure. The personalized user interface 300 illustrated in FIG. 3 comprises a window 305, which can be an application window, a container window, a browser window, or a message window for the display visual information. Window 305 can include a menu bar 310, an icon bar 315, a drop-down menu bar 320, a main panel 325, a side panel 335.

When clicked, the drop-down menu bar 320 can display selectable and scrollable commands and options for review and selection by the user. Multiple drop-down menus are shown in FIG. 3, and the selection made in one menu can determine the commands and options displayed in other menus. The elements can be personalized based on, for example, frequency, patterns of usage, and frequency of usage with clustering.

The side panel 335 can be positioned to the right of the main panel 325 within the content window 305 and can include console windows 340 and 345. Each of the console windows can include a text display and a command line interface. The text displays and command line interfaces can be personalized based on, for example, frequency, patterns of usage, and frequency of usage with clustering. For example, when a list of commands and options is displayed in the command line interface, the most frequently used commands and options can be shown towards the top of the display, and the less frequently used commands and options can be shown near the bottom.

Each interface element described above can be interrelated, such that the selection of commands or options, or the display of information, in one or more elements can interact or affect the commands or options presented, or information displayed, in other elements. This interrelation can apply to both user selections and interface personalization.

Figure 4:
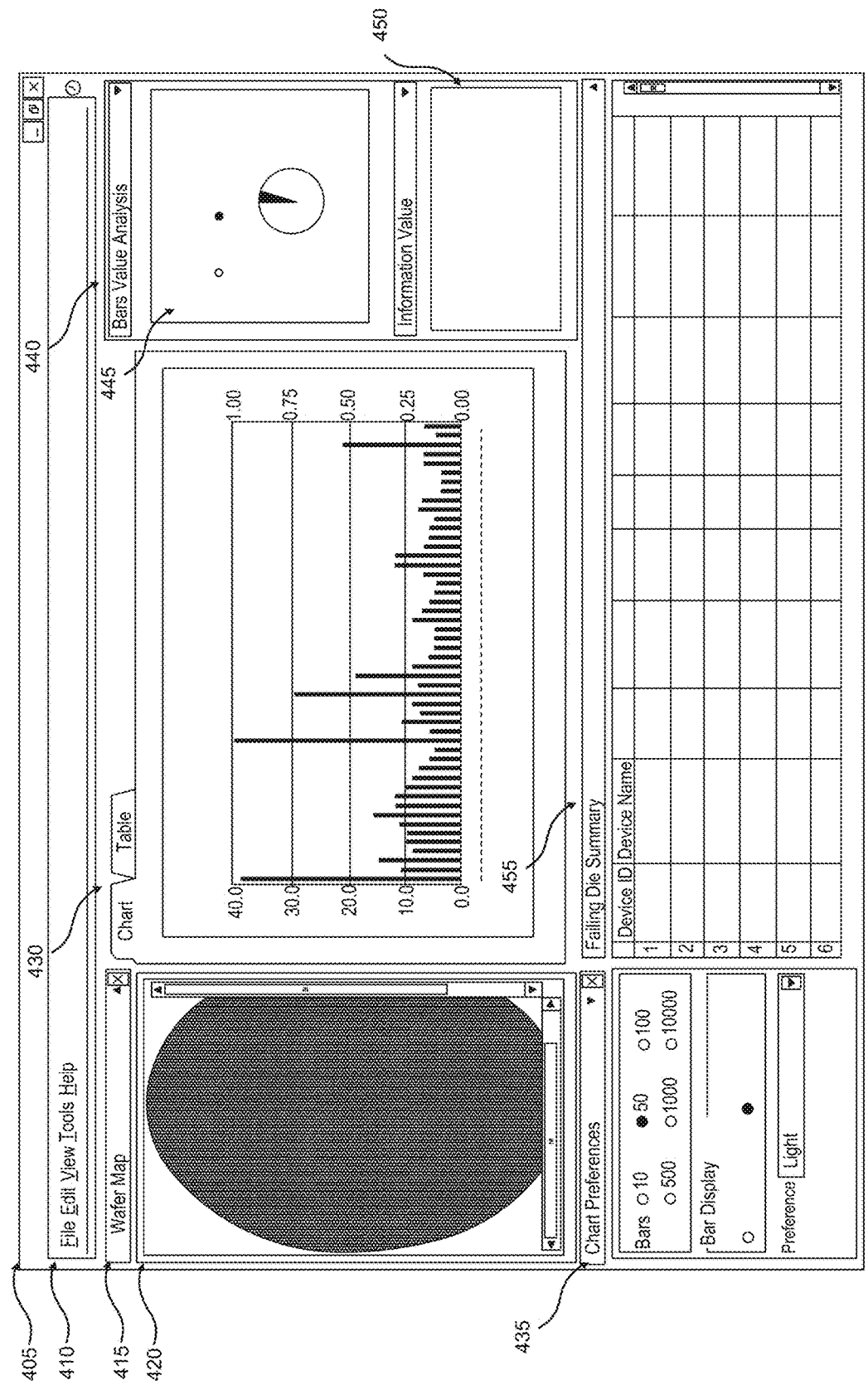
FIG. 4 illustrates an example embodiment of a personalized user interface.

FIG. 4 illustrates a personalized user interface according to an example embodiment of the present disclosure. As shown in FIG. 4, the personalized interface 400 comprises a window 405, which can be an application window, a container window, a browser window, or a message window for the display visual information. Window 405 can include a menu bar 410, and a drop-down menu 415. As before, these elements can be personalized based on, for example, frequency, patterns of usage, and frequency of usage with clustering.

In addition, the personalized interface 400 can include a plurality of docked elements positioned within window 405. In an embodiment, docked elements can be an information display, such as a graphic, an image, a picture, a chart, a table, a text console, an input/output field, or any interface element capable of displaying text or information. FIG. 4 illustrates a plurality of docked elements, including graphical docked element 425, a chart docked element 430, a chart configuration docked element 435, a multi-part docked element 440, and a table docked element 450.

FIG. 4 illustrates a graphical docked element 420 that can display a graphical image. The graphical docked element 420 can be docked on the left side of the window 405 as shown in FIG. 4, however the graphical docked element 420 can be placed anywhere within the window 405. The image displayed by the graphical docked element 420 can be a picture, a video, an interactive interface, or any other visual element. In an embodiment, the graphical image displayed by the graphical widget 420 can be selected through the use of drop-down menu 415.

A chart docked element 430 is also shown within window 405 in FIG. 4. The chart docked element 430 can display a chart, table, or other visual information. The chart docked element 430 can include one or more tabs, each of which can display visual information. The chart docked element 430 can be docked in the top center area of window 405 as shown in FIG. 4, however the chart docked element 430 can be placed anywhere within the window 405.

In an embodiment, docked elements can be interrelated, such that the selection of commands or options, or the display of information, in one or more docked elements can interact or affect the commands or options presented, or information displayed, in other docked elements. FIG. 4 shows that window 405 contains a chart configuration docked elements 435, 440, and these docked elements can include commands and options relating to the configuration, format, and selection of the chart displayed in chart docked element 430. In addition, while FIG. 4 illustrates a chart configuration docked element, it is understood that the interrelation of docked elements in not limited thereto, and embodiments of the present disclosure provides that any type of docked element can be interrelated with any other type.

In an embodiment docked elements can contain a plurality of docked sub-elements. Each of the sub-elements can be positioned with respect to the docked element and with respect to the window 405. For example, as shown in FIG. 4, the window 405 can further include a multi-part docked element 440, comprising a display docked sub-element 445 and a text console docked sub-element 450. The display docked sub-element 445 can be located at the top of the multi-part docked element 440 and in the top right corner of the window 405, and the text console docked sub-element 450 can be located at the bottom of the multi-part docked element 440 and the middle right of the window 405. However, it is understood that sub-elements can be arranged anywhere within an interface or a window. The display docked sub-element 445 and text console docked sub-element 450 can be interrelated, such that command or options selected or information displayed in one can affect commands or options presented, or information displayed, in other docked sub-elements. The display docked sub-element 445 can present a chart, image, picture or other graphical information, and the text console docked sub-element 450 can display text, and can function as, e.g., a text editor or a command line interface.

The window 405 can also include a table docked element 455. The table docked element 455 can display information in a tabular format, and the table docked element 455 can be used to represent spreadsheet data, database records, or other information. The table docked element 455 can be located at the bottom right of the window 405 as shown in FIG. 4, however, it is understood that the docked element 455 can be located anywhere within window 405.

In an embodiment, the docked elements and docked sub-elements can be displayed in any manner within the window. In an embodiment, the display of docked elements and docked sub-elements can be manually placed by the user, and the user's placement of docked elements and docked sub-elements can influence the personalization of the interface. For example, the personalized display of docked elements and docked sub-elements can be based on the user's most frequent arrangements of these elements, either in whole or in part. As another example, the user's placement docked elements and docked sub-elements can be incorporated in personalization based on usage and usage with clustering.

Figure 5:
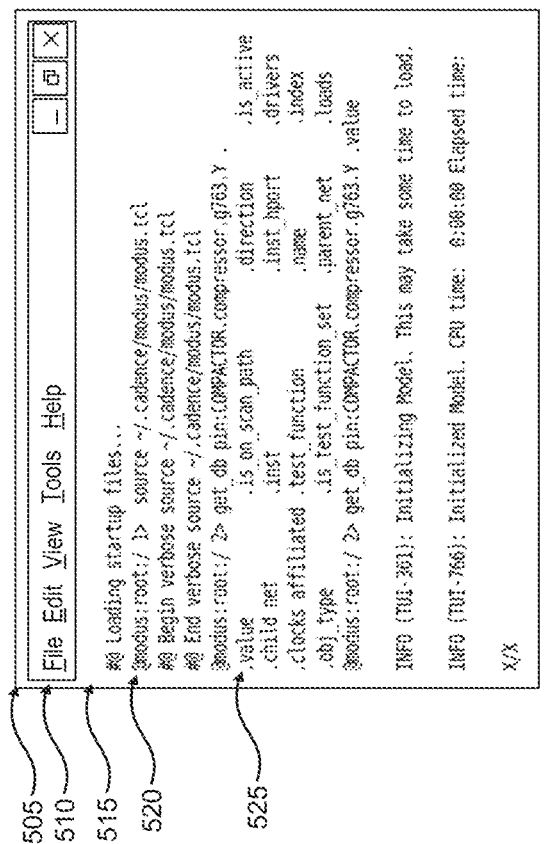
FIG. 5 illustrates an example embodiment of a personalized user interface.

FIG. 5 illustrates a personalized user interface according to an example embodiment. As shown in FIG. 5, the user interface 500 can be a text-based interface, and can comprise a window 505, a menu bar 510, and a command line interface 515. Each of these elements can be personalized based on, for example, frequency, patterns of usage, and frequency of usage with clustering.

The command line interface 515 can include one or more command lines 520, through which text commands are entered and on which textual information can be displayed. An example of the display of textual information is text output 525, in which a plurality of commands or options can be displayed. The text displayed within text output 525 can be personalized. For example, the ".value" command can be a frequently used command and accordingly, as shown in FIG. 5, the "value" command can be the first of the plurality of commands or options displayed in the text output 525. As another example, the ".is_on_scan_path" command can be a command that is used often but less frequently than the "value" command, and according it is displayed to the immediate right of the ".value" command. As a further example, the ".child net" attribute can be a command that is often used in connection with the ".value" attribute, and accordingly the ".child net" attribute can be presented immediately below the ".value" attribute.

The personalization of user interfaces can be performed through the application of machine learning to collected usage data. In an embodiment, the usage data can be collected through observation of a specific user (e.g., a user login account, a user operating within the scope of a software licensee, or a user operating as a specific software licensee) or from a group of current users (e.g., employees of a company, employees of a department within a company, employees sharing a workplace, or a pool of users operating under a group license). In another embodiment, the usage data can be collected from one or more previous users or user groups, and applied to the interface personalized for a current user. In this embodiment, the previously collected data can be selected from a set of previous users or user groups based on the expected similarity of usage, expected similarity of tasks, or other criteria. Upon the initial application of personalization based on previously collected data, further personalization can be possible based on additional collected data.

In an embodiment, machine learning techniques can be used to apply the personalization to an interface. For example, the Naïve Baye's theorem can be applied to a collection of usage data, and this theorem can be further used to revise the personalization based on the acquisition of additional usage data. Additional machine learning algorithms that can be applied include gradient boosting machine, logistic regression, neural networks, or a combination thereof, however, it is understood that other machine learning algorithms may be utilized.

Figure 6:
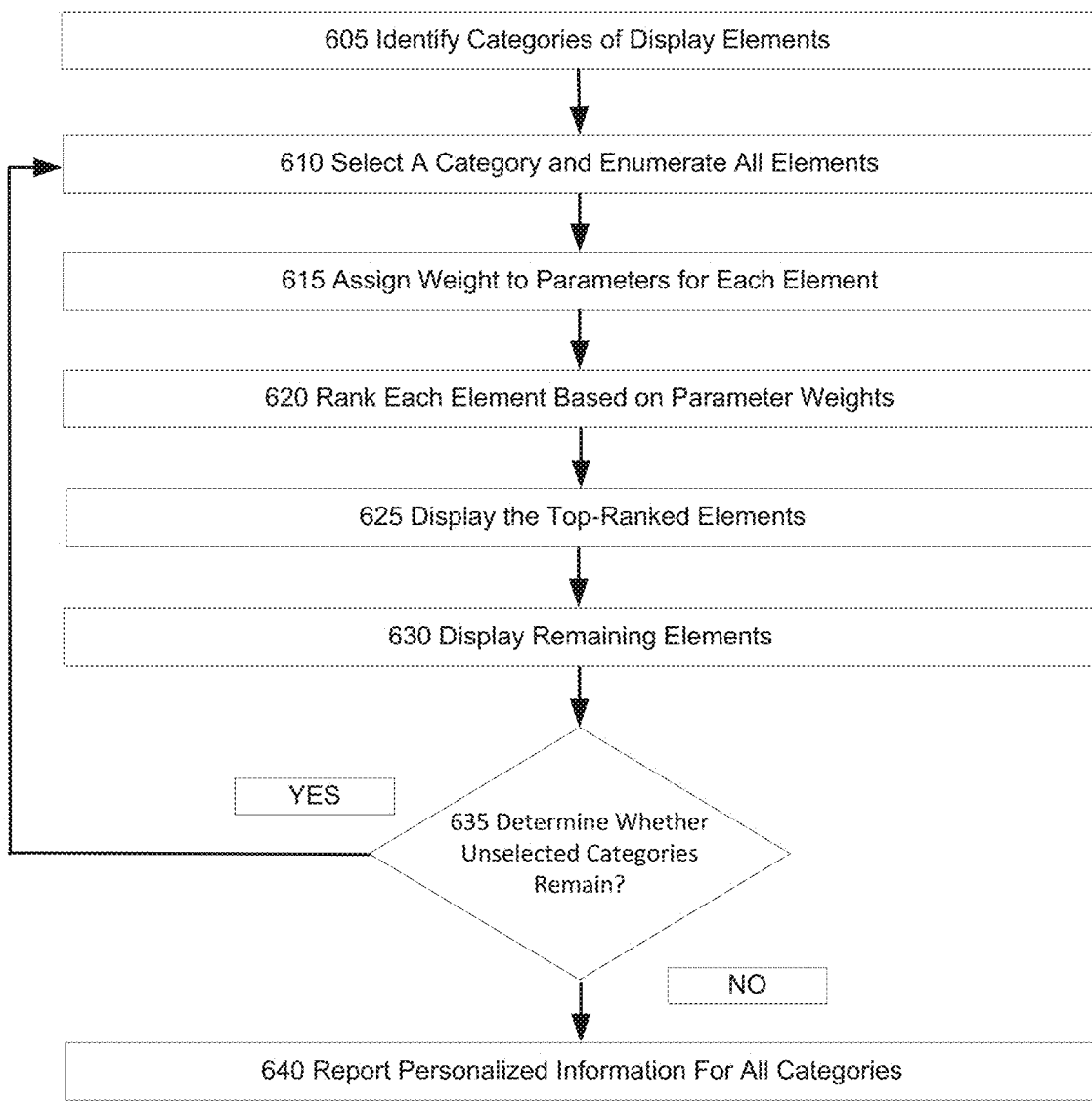
FIG. 6 illustrates an example embodiment of a method of generating a personalized user interface.

FIG. 6 illustrates a method of generating a personalized user interface according to an example embodiment. As shown in FIG. 6, the method 600 commences with step 605, where categories of interface elements are defined. Exemplary categories include, without limitation, commands, options, attributes, flows, widgets, icons, menus, menu contents, text displays, graphics, and can include any element of a graphic or text display.

Once step 605 is completed, the method 600 can proceed to an iterative process for steps 610 to 635. In step 610, a category can be selected, and each element of this category can be identified and enumerated. In an embodiment, there is no particular order of category selection or element enumeration. Alternatively, priority could be given to certain elements within a category, such as elements likely to have significant visibility or high level of use.

Upon completion of step 610, each identified enumerated element can be assigned a weight for one or more parameters in step 615. In an embodiment, the weight can be a numerical value for each parameter considered. Exemplary parameters considered in assigning a weight to an element can include, without limitation, the global usage of the element, a specific user's usage of the element, specific aspects of the usage of the element, and the tool utilized to generate the element. In an embodiment, the global usage of the element can be obtained from previously collected data from a plurality of users. The plurality of users can be a collection of all previous users, a random subset of previous users, previous users having a relationship (e.g., users affiliated with a particular company, working in a particular field, or operating under a particular license or type of license), or other collection. In contrast, the specific user's usage of the element can be collected from the history of one user. The specific aspects of the usage of the element can include patterns of usage, relation of usage to other commands and options, relation of presentation to other commands and options, method of usage (e.g., mouse click, keyboard selection, keyboard hot key), and other aspects. Exemplary parameters can also include frequency of usage of the element, patterns of usage of the element, and clustering of associated elements. In an embodiment, all utilized parameters can be considered and weighted, or a subset of parameters can be applied. In addition, the importance of each parameter can vary as appropriate.

After a weight is assigned to the parameters considered for each element, the method 600 can proceed to step 620, where each element can be ranked based on the parameter weights. In an embodiment, the approach to ranking each element can be customizable. The significance accorded to each parameter and its assigned weight can be varied. For example, a set of parameters can be more relevant to the interface of a particular application being used, to a particular project or task being performed, or to a particular user, type of user, or user group. The variations in significance given to each parameter and the weight assigned can result in different element rankings.

Upon completion of step 620, the method 600 can proceed to step 625, where the first elements of the category are displayed on the user interface. In an embodiment, the top-ranked elements can be displayed in a manner that is readily visible for the user. For example, in a category consisting of ten menu bar header elements, the three elements having the highest-ranking can be displayed, with the highest-ranked element displayed first, the second highest-ranked element displayed second, and the third highest-ranked element displayed third. The order of display can be from left to right within the menu bar, with the top-ranked element at the far left of the menu bar. It is understood that this description is exemplary, and the present disclosure contain numerous approaches of displaying elements and ordering the display of elements. It is further understood that the definition of highest-ranked elements is not limited to, e.g., the top three out of ten, and instead can range from one element to all elements within a category.

After the top-ranked elements are displayed, the method 600 can proceed to step 630, where the remaining elements of the selected category can be displayed on the interface. In an embodiment, the remaining elements can be displayed in a pre-defined order, e.g., alphabetical order, an application-defined order, or other order. As another example, the remaining elements can be displayed based on usage data collected from previous users, including from global data, a subset of previous users, or a particular previous user.

Once all elements of the selected category are displayed, the method 600 can proceed to step 635 and determine whether other categories of elements that have not been selected remain. If yes, the method 600 can return to step 610 and repeat steps 615 to 635 for each remaining category. If no, the method 600 can proceed to step 640 and report personalized information for all categories to all available user interfaces. In this step, the personalization can be applied to any other user interfaces, e.g., graphical user interfaces, web page interfaces, text console interfaces, command line interfaces. In an embodiment, the reporting can provide personalization information to other user interfaces, even if the other user interfaces are not currently displayed, to prepare for an instance when those interfaces are displayed.

Figure 7:
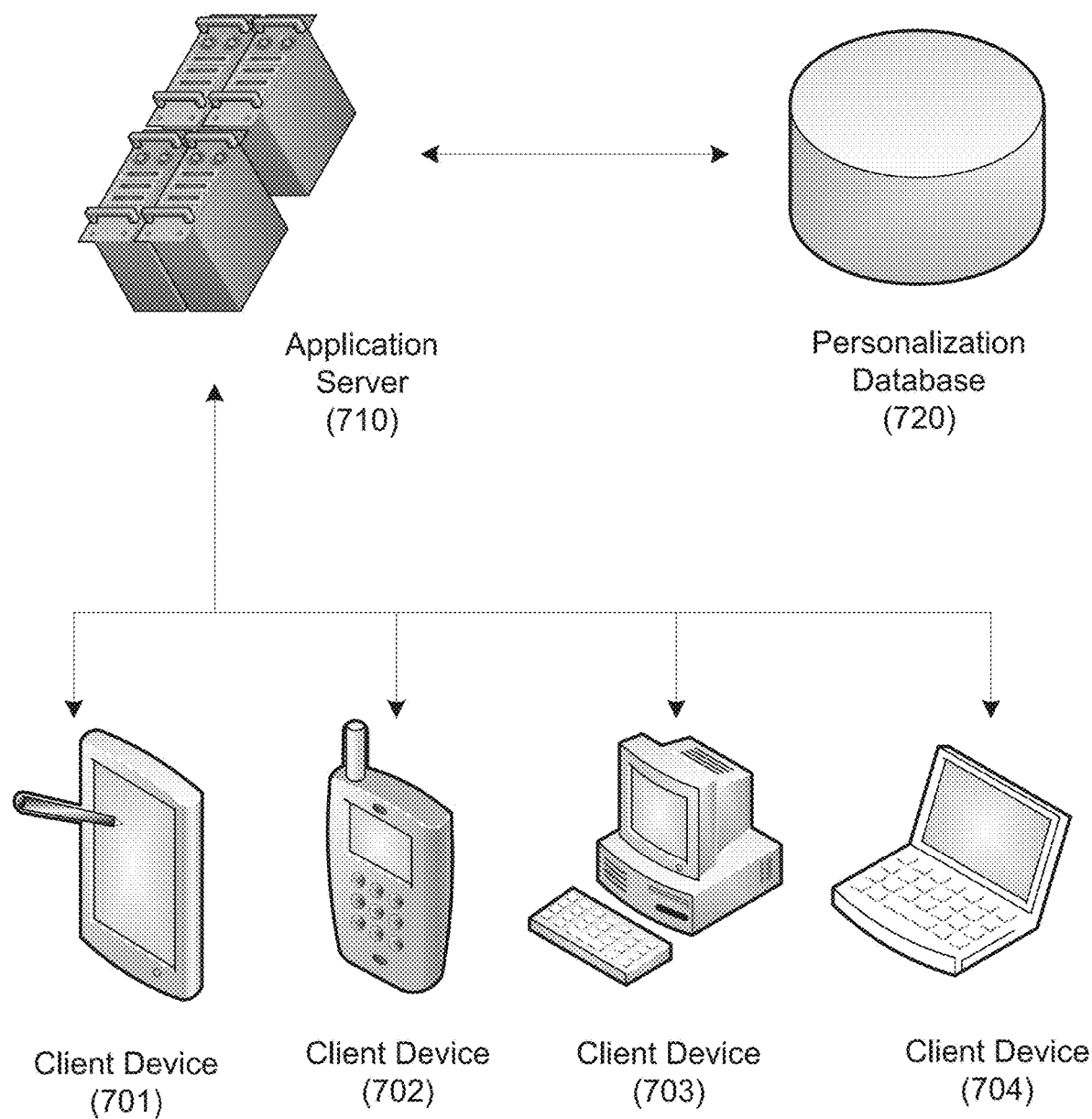
FIG. 7 illustrates an example embodiment of an interface personalization system.

FIG. 7 illustrates an interface personalization system according to an example embodiment. In this embodiment, the system 700 includes a plurality of client devices 701, 702, 703, 704, an application server 710, and a personalization database 720. As shown in FIG. 1, client device 101 may be a smartphone, client device 102 may be a laptop, client device 103 may be a desktop computer, and client device 104 may be a tablet computer. Client devices 701-704 are not limited to these examples, and may be any combination of smartphones, laptop computers, desktop computers, tablet computers, personal digital assistants, thin clients, fat clients, Internet browsers, or customized software applications. It is further understood that the client devices may be of any type of device that supports the communication and display of data and user input. While the example embodiment illustrated in FIG. 7 shows client devices 701-704, the present disclosure is not limited to a specific number of client devices, and it is understood that the system 100 may include a single client device or multiple client devices.

The personalization of user interfaces can be performed by a personalization tool, and the personalized interfaces may be displayed on one or more of the client devices 701-704. The personalization tool may be a software application and may be executed by the application server 710 using one or more processors. The personalization tool may be stored by locally on one or more of the client devices 701-704, in internal or external memory, by the application server 710, by another server, a network drive, a cloud platform, or any other remote location that is in data communication with the client devices 701-704. It is understood that the personalization database may also be stored on, or read from, other types of computer program products or computer-readable media, such as secondary storage devices, including hard disks, floppy disks, CD-ROM, or other forms of RAM or ROM. The computer-readable media may include instructions for controlling the system 700 and for performing a particular method, such as the methods described herein.

Client devices 701-704 may include a processor and a memory (not shown in FIG. 7). It is understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The memory may be a read-only memory, write-once read-multiple memory or read/write memory, e.g., RAM, ROM and EEPROM, and the client devices 701-704 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

Client devices 701-704 may further include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client devices 701-704 may also support a short-range wireless communication interface, such as near field communication, radio-frequency identification, and Bluetooth.

Client devices 701-704 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the client devices that is available and supported by the client devices 701-704, such as a touch-screen, keyboard, mouse, cursor-control device, touch-screen, microphone, digital camera, video recorder or camcorder. These devices may be used to enter information and interact with the system 700 as described herein.

The application server 710 may be dedicated server computers, such as bladed servers, or may be personal computers, laptop computers, notebook computers, palm top computers, network computers, mobile devices, or any processor-controlled device capable of supporting the system 700.

The personalization database 720 may be a relational or non-relational database, and may contain usage data used by the personalization tool. The personalization database 720 may be stored locally on one or more of client devices 701-704, or by application server 710, another server, a network drive, a cloud platform, or any other remote location that is in data communication with the personalization tool. In an embodiment, the personalization database 720 can include the collected usage data.

While FIG. 7 illustrates an application server 710 and a database 710, it is understood that other embodiments may use multiple computer systems or multiple servers as necessary or desired to support the personalization tool and may also use back-up or redundant servers to prevent network downtime in the event of a failure of a particular server. It is further understood that, if all data required by the personalization tool is available from the application server 710 or the client devices 701-704, communication with the personalization database 720 may not be necessary. In such an embodiment, the system 700 may not include the personalization database 720.

The personalization of user interfaces based on applied behavior can be further applied to user interface with the interface, such that the data collected for interface personalization can be further applied to improve auto-completion techniques. In an embodiment, the personalization tool can perform these functions. However, it is understood that this can be accomplished by a separate software tool.

In an embodiment, the personalization tool can recognize situations where certain commands must be used together, or are frequently used together, in a text console interface or a command line interface. For example, if an exemplary command "physicalserverreport" requires that an exemplary "physicalserverhost" option must be completed, the personalization tool can automatically prompt the user to complete the "physicalserverhost" option once data associated with, or instructions for, the "physicalserverreport" command is input. In another example, upon collection of sufficient usage data from the user or elsewhere, the personalization tool can prompt the user with common or suggested inputs for the "physicalserverhost" option or automatically complete the "physicalserverhost" option.

In an embodiment, the personalization tool can improve the suggestion and completion of dependent values associated with commands or options. For example, if an exemplary command "monitor—logic" is specified and this command requires an exemplary "multidefects" option to a value of "yes," the personalization tool can display the "multidefects—yes" option for the user's acceptance. As another example, the personalization tool could automatically set the "multidefects—yes" option without requiring further user action. Accordingly, the personalization tool can recognize mandatory specifications required for actions taken by the user and propose or automatically apply those specifications.

In an embodiment, the personalization tool can further improve the process of inputting commands and options by automatically correcting spelling errors. For example, if there is an exemplary command "report_test_structures" and the user mistakenly types "report_test_structures," the personalization tool can automatically correct the input to "report_test_structures." The automatic correction of input can be improved by collected usage data and personalization applied to the interface through which the user's input is received.

It is understood that the elements shown in the figures, and the position and contents of these elements, as well as their quantities, are illustrated as examples. The present disclosure applies to the position, contents, and quantities, of any element of a user interface.

In the foregoing Detailed Description, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

What is claimed is:

1. A system for generating a personalized user interface, the system comprising:

a memory comprising machine-readable instructions, the machine-readable instructions comprising a software application having a user interface, and a personalization software tool programmed to monitor usage of the software application by a user, the user interface comprising a plurality of elements; and a processor configured to access and execute the machine-readable instructions, the personalization software tool being programmed to:

(a) collect user usage information relating to the use of the software application by the user, the user usage information comprising one or more parameters, each parameter characterizing at least one of frequency of use of each of the plurality of elements, a pattern of usage of each the plurality of elements, and a relation of usage of each element to other elements of the plurality of elements;

(b) identify categories of the plurality of elements, wherein each of the one or more elements of the plurality of elements are assigned to a respective category;

(c) select a first category and identify each element of the selected category among the plurality of elements;

(d) assign a weight to the one or more parameters for each element of the selected category among the plurality of elements;

(e) rank each of the one or more elements of the plurality of elements of the user interface within its assigned category based on the one or more parameters and respectively assigned weight;

(f) identify a first subset of the selected category corresponding to top-ranked elements among the plurality of elements in response to ranking of each of the plurality of elements;

(g) display the top-ranked elements of the plurality of elements on the user interface according to the ranking based on the one or more parameters;

(h) re-rank a second subset of the selected category corresponding to remaining elements of the selected category based on global user usage information relating to the use of the software application by a plurality of users, the global user usage information characterizing a usage of each of the second subset of the selected category by the user on the user interface;

(i) display the remaining elements of the selected category on the user interface according to the re-ranking based on the global user usage information;

(j) after displaying all elements of the selected category, determine whether other categories of elements that have not been selected remain;

(k) repeat steps (a) to (i) when the other categories of elements that have not been selected remain; and (l) after displaying all elements of the other categories of elements, report personalized information for all categories to all available user interfaces.

2. The system for generating the personalized user interface of claim 1, wherein the plurality elements of the user interface correspond to at least one of a plurality of icons, a plurality of radio buttons, a plurality of check boxes, a plurality of menus, a plurality of menu choices, and a plurality of text boxes.

3. The system for generating the personalized user interface of claim 1, wherein the user interface is a text console, and the plurality elements correspond to at least one of a plurality of commands, a plurality of options, and a plurality of files.

4. The system for generating the personalized user interface of claim 1, further comprising one of a server and client device, the server or the client device comprising the memory and the processor.

5. The system for generating the personalized user interface of claim 1, wherein the personalization software tool is configured to store in the memory the collected user usage information as part of a personalization database, the personalization database comprising the global user usage information.

6. The system for generating the personalized user interface of claim 5, wherein the plurality of users share a common relation, and the common relation is at least one of a workplace, an employer, and a license to the software application.

7. The system for generating the personalized user interface of claim 5, wherein the one or more parameters correspond to a plurality of parameters, each parameter of the plurality of parameters being associated with a respective significance value characterizing a relevance of a given parameter for ranking of each of the plurality of elements of the user interface.

8. The system for generating the personalized user interface of claim 1, wherein the one or more parameters characterize a method of usage of each of the plurality of elements, the method of usage including one of a mouse click and a keyboard click.

9. The system for generating the personalized user interface of claim 1, wherein the personalization software tool is programmed to rank each of the plurality of elements of the user interface based on a plurality parameters that include the one or more parameters.

10. The system for generating the personalized user interface of claim 1, wherein the personalization software tool is programmed to provide the user usage information using at least one machine learning technique.

11. The system for generating the personalized user interface of claim 1,
wherein each parameter of the one or more parameters is associated with a respective significance value characterizing a relevance of a given parameter for ranking of each of the plurality of elements of the user interface, and
wherein the relevance of the given parameter is determined based on one of a particular project or task being performed via the software application by the user, a type of user, and a user group associated with the user.

12. The system for generating the personalized user interface of claim 1, wherein display the top-ranked elements on the user interface comprises:
identifying a first element of the top-ranked elements having a higher ranking than a second element of the top-ranked elements; and
displaying the first element in a more prominent location of the user interface than the second element.

13. The system for generating the personalized user interface of claim 1, wherein display the top-ranked elements on the user interface comprises:
identifying a first element of the top-ranked elements having a lower ranking than a second element of the top-ranked elements; and
displaying the first element in a less prominent location of the user interface than the second element.

14. The system for generating the personalized user interface of claim 1, wherein the user interface is a first user interface and the plurality of elements is a first set of a plurality of elements, the software application comprising a second user interface comprising a second set of a plurality of elements, wherein the personalization software tool is programmed to:

generate personalized ranking information characterizing a ranking of the top-ranked elements among the plurality of elements for the first user interface; and display the the second set of the plurality of elements on the second user interface based on the personalized ranking information.

15. The system for generating the personalized user interface of claim 1, wherein the global user usage information is stored in a personalization database, the personalization database comprising respective global user usage information relating to a use of a given software application of a plurality of different software applications by a respective group of users, wherein a given group of users of the respective group of users corresponds to the plurality of users.

16. The system for generating the personalized user interface of claim 15, wherein the user has a relationship with the given group of users, the relationship comprising one of being affiliated with a similar company, working in a same technical field and operating under a particular type of license.

17. A method for generating a personalized user interface, the method comprising:

(a) monitoring a software application being used by a user to collect user usage information relating to a use of the software application that includes a user interface comprising a plurality of elements, the user usage information comprising one or more parameters, each parameter characterizing at least one of frequency of use of each of the plurality of elements, a pattern of usage of each the plurality of elements, and a relation of usage of each element to other elements of the plurality of elements;

(b) identifying categories of the plurality of elements, wherein each of the one or more elements of the plurality of elements are assigned to a respective category;

(c) selecting a first category and identifying each element of the selected category among the plurality of elements;

(d) assigning a weight to the one or more parameters for each element of the selected category among the plurality of elements;

(e) ranking each of the one or more elements of the plurality of elements of the user interface within its assigned category based on the one or more parameters and respectively assigned weight to identify a first subset of the selected category corresponding to top-ranked elements among the plurality of elements;

(f) displaying the top-ranked elements of the plurality of elements on the user interface according to the ranking based on the one or more parameters;

(g) re-ranking a second subset of the selected category corresponding to remaining elements of the selected category based on global user usage information relating to the use of the software application by a plurality of users, the global user usage information characterizing a usage of each of the second subset of the selected category by the user on the user interface;

(h) displaying the non-top ranked elements of the plurality of elements on the user interface according to the re-ranking based on the global user usage information;

(i) determining whether other categories of elements that have not been selected remain in response to displaying all elements of the selected category;

(j) repeating steps (a) to (h) when the other categories of elements that have not been selected remain; and (k) reporting personalized information for all categories to all available user interfaces in response to displaying all elements of the other categories of elements.

18. The method for generating the personalized user interface of claim 17, wherein the user interface is a first user interface and the plurality of elements is a first set of a plurality of elements, the software application comprising a second user interface comprising a second set of a plurality of elements, the method further comprising:

generating personalized ranking information characterizing a ranking of the top-ranked elements among the plurality of elements for the first user interface; and displaying the second set of the plurality of elements of the second user interface based on the personalized ranking information.

19. The method for generating the personalized user interface of claim 17, wherein the one or more parameters correspond to a plurality of parameters, each parameter of the plurality of parameters being associated with a respective significance value characterizing a relevance of a given parameter for ranking of each of the plurality of elements of the user interface, and wherein the relevance of the given parameter is determined based on one of a particular project or task being performed via the software application by the user, a type of user and a user group associated with the user.

20. The method for generating the personalized user interface of claim 17, wherein the user has a relationship with the plurality of users, the relationship comprising one of being affiliated with a similar company, working in a same technical field and operating under a particular type of license.

* * * * *